Sept. 5, 1933.　　　　　　E. W. TRUCKER　　　　　　1,925,944
SPRING OILING DEVICE
Filed May 18, 1931
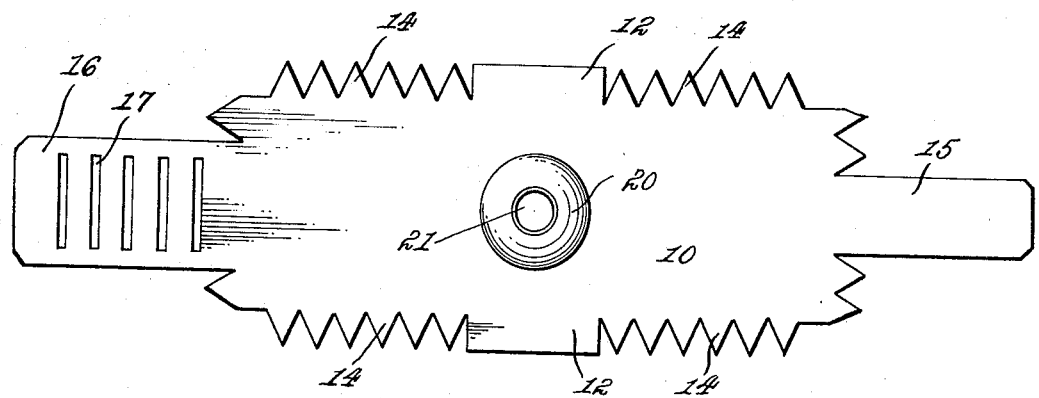
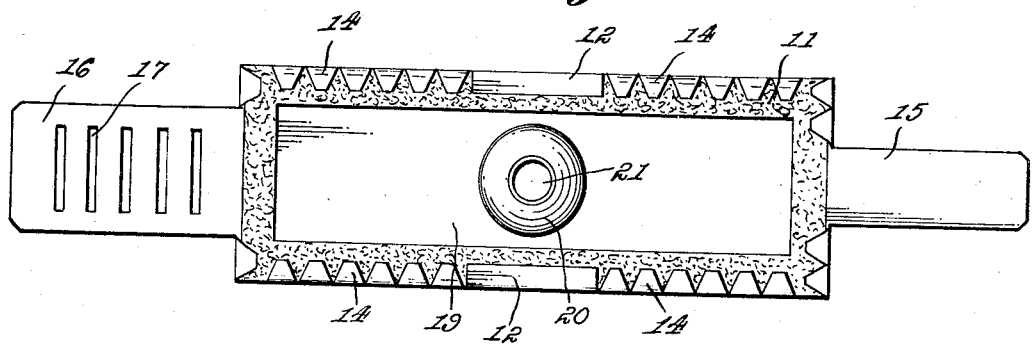
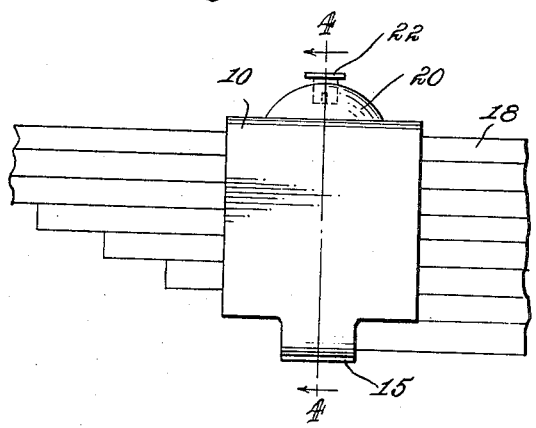
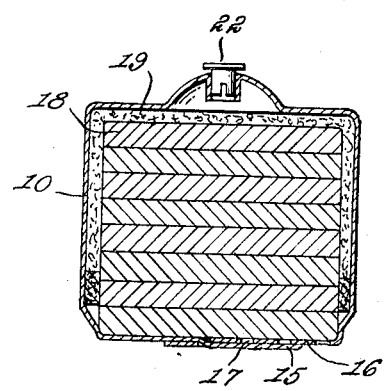
Edward W. Trucker, INVENTOR
BY Victor J. Evans
ATTORNEY Patented Sept. 5, 1933

1,925,944

UNITED STATES PATENT OFFICE 1,925,944

SPRING OILING DEVICE

Edward Ward Trucker, Woodhaven, N. Y.

Application May 18, 1931. Serial No. 538,361

1 Claim. (Cl. 184—1)

The object of the invention is to provide a leaf spring lubricator readily attachable to a leaf spring in embracing relation to the latter, so that a lubricant chamber or reservoir is provided in communication with the contacting edges of the spring leaves, whereby lubricant carried in the chamber may find its way between the leaves to continuously maintain the proper lubrication of the latter; to provide a lubricator of this kind which is so constructed that it may be readily attached to a spring without the use of tools and without the necessity for skill on the part of the user; to provide a lubricator which when attached will successfully exclude oil or grit from the lubricant reservoir or chamber; to provide a lubricator adapted for use with either oil or grease by reason of its being easily detachable for charging with the latter, or for charging with oil without detachment; and to provide a device of this nature which is of simple form and susceptible of cheap manufacture.

With this object in view, the invention consists in a construction and combination of parts of which a preferred embodiment is illustrated in the accompanying drawing, wherein:

Fig. 1 is a plan view of the blank, after forming, from which the invention is constructed.

Fig. 2 is a view similar to Fig. 1 but showing the device in its flat form, in which shape it will be held until applied.

Fig. 3 is a side elevational view of the invention applied in operated position, portions of the leaves of a leaf spring being shown; and Fig. 4 is a sectional view on the plane indicated by the line 4—4 of Fig. 3.

The invention consists essentially of but two parts, the plate 10 and the spacer 11, the latter being of a readily compressible material of the character of felt. The plate 10 is of pliable material struck from sheet metal so as to provide the central ears 12 and the triangular shaped ears 14, these being bent over the edges of the spacer 11 to secure the latter to one face of the plate, the spacer thus bounding an area which, when the plate is attached in operative position determines the extent of the lubricant reservoir or chamber.

The blank 10 is formed with strap extensions 15 and 16 at opposite ends, with the latter being provided with a series of parallel slits 17, of a length corresponding to the width of the strap 15.

Since the plate 10 is of pliable material, it is readily bent around the leaves of the spring, as indicated in Fig. 3, when the strap 15 is passed through one of the slits in the strap 17, thus securing the plate to the spring, the ears 12 resting on the upper face of the topmost leaf 18 of the spring.

Since the width of the spacer 11 exceeds the width of the tongues 12 and 14, the spacer will bear on the spring leaves throughout its extent and its inner edge, together with the inner face of the plate 10 and the contacting portions of the spring leaves will define a lubricant receiving chamber 19 which will be in communication with all of the spring leaves, so that any lubricant contained in the chamber will find its way between the leaves and be distributed by reason of the relative movement of the leaves.

The plate 10 at the center is bulged outwardly as indicated at 20 and a perforation or hole 21 is formed at the center of this bulge, this being adapted for the reception of a frictionally retained dust cap 22.

If the lubricant used be in fluid form, as oil, the chamber 19 may be charged from a can through the perforation 21, but if the lubricant be grease the chamber may be charged by disconnecting the device and disposing the grease on the plate within the edges of the spacer 11.

The spacer being of the character of felt, dust and grit are successfully excluded when the device is attached.

The ears 14 are made of the triangular form shown to enable the ready bending of the plate to suit the various widths of spring leaves encountered in practice.

What is claimed as new is:

A leaf spring lubricator comprising a plate of pliable material formed with strap extensions at its ends, one of said straps having means by which engagement with the other may be effected to hold the plate in embracing relation with a leaf spring, said plate being formed throughout its perimeter with pliable ears tapering to points at their free edges, a narrow apertured spacer of the character of felt disposed against one face of the plate and having said pliable ears turned over and down against its top face, whereby the plate may be applied to a leaf spring with the spacer in contact with the top face of one leaf and the edges of adjacent leaves and it and the plate defining an oil receiving chamber, the spacer between adjacent teeth due to their tapering shape permitting exposure of the spacer between teeth and thereby its firm engagement with the spring leaf.

EDWARD WARD TRUCKER.